(12) United States Patent
Karmarkar et al.

(10) Patent No.: US 11,850,907 B2
(45) Date of Patent: Dec. 26, 2023

(54) WHEEL CARRIER FOR A SUSPENSION OF A MOTOR VEHICLE

(71) Applicants: Hyundai Motor Company, Seoul (KR); Kia Corporation, Seoul (KR)

(72) Inventors: Ameya Karmarkar, Russelsheim am Main (DE); Christian Ludwig, Zwingenberg (DE); Kadir Oguzcanger, Mainz (DE); Alessandro Salgarello, Mainz (DE); Lorenzo Falchi, Rüsselsheim am Main (DE); Daniel Hahn, Berlin (DE); Florian Goy, Schoffengrund (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/867,367

(22) Filed: Jul. 18, 2022

(65) Prior Publication Data
US 2023/0311600 A1  Oct. 5, 2023

(30) Foreign Application Priority Data
Apr. 5, 2022  (DE) .......................... 102022203346.9

(51) Int. Cl.
*B60G 3/00* (2006.01)
*B60G 3/01* (2006.01)
(Continued)

(52) U.S. Cl.
CPC .................. *B60G 3/00* (2013.01); *B60G 3/01* (2013.01); *B62D 5/04* (2013.01); *B62D 5/0418* (2013.01);
(Continued)

(58) Field of Classification Search
CPC ... B60G 3/00; B60G 3/01; B60G 7/00; B60G 15/061; B60G 2300/37; B62D 5/04;
(Continued)

(56) References Cited

U.S. PATENT DOCUMENTS

| | | | | |
|---|---|---|---|---|
| 3,771,813 A | * | 11/1973 | Stotz | B60G 7/00 267/221 |
| 5,103,530 A | * | 4/1992 | Andrisin, III | B60B 33/045 16/48 |

(Continued)

FOREIGN PATENT DOCUMENTS

| | | | | |
|---|---|---|---|---|
| CA | 2885549 A1 | * | 3/2014 | ............... A61G 5/04 |
| CN | 101973307 A | * | 2/2011 | |

(Continued)

*Primary Examiner* — Jason D Shanske
*Assistant Examiner* — Daniel M. Keck
(74) *Attorney, Agent, or Firm* — Fox Rothschild LLP (57) ABSTRACT

Disclosed is a wheel carrier for a suspension of a motor vehicle; and a motor vehicle comprising the wheel carrier. In a preferred system, the wheel carrier comprises a first carrier segment configured to carry a wheel of the motor vehicle at a wheel center; and a second carrier segment configured to couple the first carrier segment with a vehicle body of the motor vehicle. The second carrier segment comprises at least one groove, and the first carrier segment comprises for each groove a corresponding sliding pin configured to slidingly engage the respective groove such that the pin slides along the groove under vertical and/or horizontal displacements of the wheel center with respect to the second carrier segment.

13 Claims, 3 Drawing Sheets

(51) Int. Cl.
*B60G 7/00* (2006.01)
*B60G 7/04* (2006.01)
*B60B 33/00* (2006.01)
*B62D 5/04* (2006.01)
*B62D 63/04* (2006.01)
B60G 15/06 (2006.01)
B60B 33/04 (2006.01)
B62D 7/00 (2006.01)
B62D 7/06 (2006.01)
B62D 7/16 (2006.01)

(52) U.S. Cl.
CPC .............. *B62D 63/04* (2013.01); *B60B 33/00* (2013.01); *B60B 33/0002* (2013.01); *B60B 33/0015* (2013.01); *B60B 33/0018* (2013.01); *B60B 33/0021* (2013.01); *B60B 33/04* (2013.01); *B60B 33/045* (2013.01); *B60G 7/00* (2013.01); *B60G 7/003* (2013.01); *B60G 7/006* (2013.01); *B60G 7/04* (2013.01); *B60G 15/061* (2013.01); *B60G 2300/37* (2013.01); *B62D 7/00* (2013.01); *B62D 7/06* (2013.01); *B62D 7/16* (2013.01)

(58) Field of Classification Search
CPC ........ B62D 5/0418; B62D 63/04; B62D 7/00; B62D 7/06; B62D 7/16; B60B 33/00; B60B 33/04; B60B 33/045; B60B 33/0015; B60B 33/0018; B60B 33/0021; B60B 33/0002

See application file for complete search history.

(56) References Cited

U.S. PATENT DOCUMENTS

| | | | |
|---|---|---|---|
| 10,106,005 B2 * | 10/2018 | Yang | ....................... B60B 33/08 |
| 2002/0084608 A1 * | 7/2002 | Marshburn | ........... B60B 33/045 280/79 |
| 2012/0306173 A1 * | 12/2012 | Meitinger | .............. B60G 7/006 280/86.758 |
| 2014/0300067 A1 * | 10/2014 | Yoo | ........................ B60G 7/006 280/5.514 |

FOREIGN PATENT DOCUMENTS

| | | | | |
|---|---|---|---|---|
| CN | 102317094 A | * | 1/2012 | ............. B60G 7/006 |
| CN | 111619286 A | * | 9/2020 | ......... B60B 33/0002 |
| WO | WO-2018177642 A1 | * | 10/2018 | ........... B50G 15/068 |
| WO | WO-2018210587 A1 | * | 11/2018 | ............... B60G 3/20 |
| WO | WO-2020259833 A1 | * | 12/2020 | |

* cited by examiner

WHEEL CARRIER FOR A SUSPENSION OF A MOTOR VEHICLE

CROSS-REFERENCE TO RELATED APPLICATION

This application is based on and claims under 35 U.S.C. § 119 (a) the benefit of priority to German Patent Application No. 102022203346.9, filed in the Korean Intellectual Property Office on Apr. 5, 2022, the entire contents of which are incorporated herein by reference.

Technical Field

Embodiments of the present disclosure pertain to a wheel carrier for a suspension of a motor vehicle and a motor vehicle having a suspension with such a wheel carrier.

Description of Related Art

A suspension layout as used in current passenger vehicles may not be required for small to medium scale automated Purpose Built Vehicles (PBV). In some applications, e.g., non-passenger logistics, these kind of PBVs may be fully autonomous and not even carry passengers, which may reduce the ride and handling requirements of a PBV suspension system. On top of that, conventional suspension systems typically require a large number of individual parts that would create package and payload volume restrictions on small to medium sized PBVs. Typical applications for PBVs may also benefit and/or may require additional flexibility and controllability compared to more conventional vehicles. For example, it may be desired that the PBV is able to turn on the spot and/or move sideways. These and further developments may require a new completely new design approach to chassis hardware.

Solutions for electric PBVs with autonomous driving capabilities have been proposed recently that integrate steering, braking, suspension and electric drive systems in one integrated wheel module (these modules are sometimes called "corner modules"). PBVs may then be powered by four such modules. Currently available corner modules however often have multiple links attached to a single-piece wheel carrier unit and suffer from high costs, complexity and weight.

One such concept is the compact Schaeffler Paravan intelligent corner module, which has all drive-system and chassis components housed in one space-saving unit that also contains the wheel hub motor, the wheel suspension and the electromechanical steering system.

Another such corner module was revealed by NEVS/Protean. In this case a single module integrates a vehicle's powertrain, suspension and 360° steering for each wheel.

SUMMARY

In light of the above, there is a need to find simple, space- and cost-efficient solutions that offer a reasonable level of vertical and longitudinal wheel compliance.

To this end, embodiments of the present disclosure provide a wheel carrier suitably for a suspension of a motor vehicle, comprising: a) a first carrier segment configured to carry a wheel of the motor vehicle at a wheel center; and b) a second carrier segment configured to couple the first carrier segment with a vehicle body of the motor vehicle; wherein the second carrier segment comprises at least engagement member and the first carrier segment comprises for for a second segment engagement member a corresponding engagement member (first carrier segment engagement member) configured to engage the second carrier segment engagement member.

In certain preferred aspects, the first carrier segment and second engagement members may be male and female-type engaging or mating features. For instance, the second carrier segment engagement member may be a female-type engagement feature, and the first carrier segment engagement member may be a male-type engagement feature. In alternative configurations, the second carrier segment engagement member may be a male-type engagement feature, and the first carrier segment engagement member may be a female-type engagement feature.

In a preferred embodiment, a wheel carrier for a suspension of a motor vehicle is provided, comprising: a) a first carrier segment configured to carry a wheel of the motor vehicle at a wheel center; and b) a second carrier segment configured to couple the first carrier segment with a vehicle body of the motor vehicle; wherein the second carrier segment comprises at least one groove, and the first carrier segment comprises for each groove a corresponding sliding pin configured to slidingly engage the respective groove such that the pin slides along the groove under vertical and/or horizontal displacements of the wheel center with respect to the second carrier segment.

According to one embodiment of the present disclosure, a wheel carrier for a suspension of a motor vehicle comprises a first carrier segment configured to carry a wheel of the motor vehicle at a wheel center; and a second carrier segment configured to couple the first carrier segment with a vehicle body of the motor vehicle; wherein the second carrier segment comprises at least one groove and the first carrier segment comprises for each groove a corresponding sliding pin configured to slidingly engage the respective groove such that the pin slides along the groove under vertical and/or horizontal displacements of the wheel center with respect to the second carrier segment.

According to another embodiment of the present disclosure, a motor vehicle has a suspension with at least one wheel carrier according to embodiments of the present disclosure.

One idea of embodiments of the present disclosure is to split up the wheel carrier into two parts. One part is affixed to the wheel, the other to the vehicle body. Relative motion between these two carrier segments is enabled in a flexible yet simple manner based on a groove and sliding pin design concept to achieve the desired longitudinal compliance and wheel recession over a wide range without having to compromise on other suspension design parameters like bump steer, toe change etc. The specific configuration of the grooves and the pins may be adapted to suit each individual PBV use case.

It is understood that the term "vehicle" or "vehicular" or other similar term as used herein is inclusive of motor vehicles in general such as passenger automobiles including sports utility vehicles (SUV), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Advantageous embodiments and improvements of the present disclosure are found in the subordinate claims.

According to an exemplary embodiment of the present disclosure, the at least one groove may extend linearly along a straight line under a vertical inclination angle.

The groove and sliding pin arrangement permits a high level of design freedom to develop different and customizable relative motion profiles between the two parts of the wheel carrier. Indirectly, this allows the person of skill to design the groove profile according to the suspension compliance requirements of the PBV or other application. The groove shape/profile may, for example, be cut into the second wheel carrier segment.

This exemplary embodiment follows a very elementary groove and sliding pin arrangement. In this case, the groove design provides one ratio between the vertical (vehicle Z) and horizontal (longitudinal, vehicle X) displacements of the wheel center.

According to an exemplary embodiment of the present disclosure, the at least one groove may extend linearly along a first straight line segment with a first vertical inclination angle and from there along a second straight line segment with a second vertical inclination angle. The first vertical inclination angle may be smaller than the second vertical inclination angle. The straight line segments may be arranged such that the corresponding sliding pin first moves along the first straight line segment under vertical and/or horizontal displacements of the wheel and then along the second straight line segment.

The groove arrangement of this embodiment is more ride comfort oriented. The groove of this variant allows in the first segment a greater amount of longitudinal compliance (vehicle X) for a comparatively small amount of vertical travel (vehicle Z). Thereafter, the ratio may be more balanced between horizontal and vertical in the second segment. The geometric design including segment lengths and orientations may be optimized by the person of skill according to the specific use case at hand.

According to an exemplary embodiment of the present disclosure, the first vertical inclination angle may be smaller than 45° and the second vertical inclination angle may be larger than 45°.

For example, the first vertical inclination angle may be between 10° and 30° while the second vertical inclination angle may be between 60° and 80°. It is to be understood however that the person of skill will readily conceive suitable configurations for the size and orientation of the grooves for each use case.

According to an exemplary embodiment of the present disclosure, the at least one groove may extend linearly along a third straight line segment having a protection spring arranged therein, the protection spring being configured to compress under contact with the corresponding sliding pin entering the third straight line segment.

This embodiment puts its focus on rough road and/or misuse conditions, where potholes, bumps and/or other obstacles may lead to frequent impacts on the vehicle's wheels that need to be compensated by the suspension system. In this embodiment, protection is implemented directly within the groove design. In misuse cases where the wheel center hits a large obstacle, the wheel initially moves along the normal groove segments until the spring and damper unit is fully compressed. Thereafter, the impact energy may then be consumed in compressing the protection spring of the third groove segment, which limits or deters damage to the other parts of the suspension and vehicle body further up the structure.

For example, this embodiment may be combined with an exemplary embodiment where the groove comprises first and second straight line segments with different vertical inclination angles. The second straight line segment may extend into the third straight line segment containing the protection spring.

According to an exemplary embodiment of the present disclosure, the least one groove may be aligned substantially vertical in a neutral configuration in order to provide vertical compliance. The first carrier segment may be rotatably coupled to the second carrier segment via a torsion spring such that the first carrier segment is rotated around the sliding pin with respect to the second carrier segment under horizontal displacement of the wheel and the torsion spring generates a restoring force on the first carrier segment to return to the neutral configuration.

This design concept separates the provision of the longitudinal and vertical hub compliance. The groove and sliding pin arrangement is used to provide compliance exclusively in the vehicle Z direction. The vehicle X compliance is delivered via rotation of the first carrier segment. Upon hitting an impact, the first carrier segment rotates to absorb the impact. This rotation is resisted by the torsion spring. Eventually, the first carrier segment is returned to its original position. The torsion spring may be mounted between the two carrier parts with each end of the spring fixed to either part of the wheel carrier.

According to an exemplary embodiment of the present disclosure, the second carrier segment may comprise at least one end stop configured to block rotation of the first carrier segment beyond a predefined angle.

Hence, mechanical stops may be positioned in a way to restrict the maximum rotation angle of the first carrier segment relative to the second carrier segment.

According to an exemplary embodiment of the present disclosure, one end stop may block movement of the first carrier segment in a forward direction of the wheel.

A first stop may thus keep the first carrier segment from rotating to the front (forward with respect to the wheel).

According to an exemplary embodiment of the present disclosure, one end stop may block movement of the first carrier segment in a backward direction of the wheel beyond a maximum rotation angle.

A second stop may limit the maximum available longitudinal compliance. The stops may be made, for example, of metal with a rubber layer bonded on the contact surface to provide some progression and to minimize contact noise.

According to an exemplary embodiment of the present disclosure, each pin may be formed with a stepped bearing profile along a vehicle lateral direction of the wheel and each groove may be formed with a complementary stepped bearing profile along the vehicle lateral direction to lock each pin within the respective groove in the vehicle lateral direction.

A stepped design of the sliding pin assembly may help to minimize play between the first and second carrier segments of the wheel carrier in the lateral vehicle direction (Y direction). Since the difference between the dimensions of both carrier segments needs to be minimal, a lubrication film may be advantageous at the interfacing/mating surfaces.

According to an exemplary embodiment of the present disclosure, each pin may comprise a pin shaft and a removable pin head configured to be fixed on the respective pin shaft to mount the first carrier segment to the second carrier segment by first plugging in each pin into the respective groove from one lateral side and then attaching the respective pin head to the respective pin shaft from the respective other lateral side, thereby locking the first carrier segment to the second carrier segment along the vehicle lateral direction of the wheel.

The assembly of the first and second carrier segments of the wheel carrier unit may thus be facilitated by a removeable pin head, which is a separate part that can be secured to the pin shaft via a thread and torque method, for example, after aligning the first and second carrier segments of the wheel carrier assembly.

According to an exemplary embodiment of the present disclosure, a sliding bearing may be press-fitted on each pin shaft of the first carrier segment to receive a corresponding mating surface of the respective grooves of the second carrier segment.

Existing, available sliding bearing technology may provide advantages between the segments to facilitate smooth relative motion between the two parts of the wheel carrier along the profile of the grooves. Since the sliding pin may particularly have a circular profile, commercially available sliding bearings could simply be press-fitted on the pin shaft. The corresponding mating surfaces in the groove (second carrier segment) may be provided with a compatible low friction surface treatment, coating and/or fine polishing or the like.

According to an exemplary embodiment of the present disclosure, the second carrier segment may be configured to be rotatably fixed to the vehicle body to rotate around a vertical axis of the motor vehicle.

In this case, a steering motor may enable steering of the wheel by actuating the second carrier segment accordingly.

According to an exemplary embodiment of the present disclosure, the motor vehicle may further comprise a steering motor for each wheel coupled to the respective wheel carrier and configured to rotate the respective wheel around a vertical axis of the motor vehicle by rotating the wheel carrier accordingly.

The steering motor may be complemented by a drive motor providing the torque to move the vehicle forwards and backwards. Such a drive motor could, for example, be fitted directly inside the wheel (in-wheel) or installed as a modular unit on the first and/or second carrier segment.

In another aspect, vehicles are provided that comprise an apparatus as disclosed herein.

Embodiments of the present disclosure will be explained in greater detail with reference to exemplary embodiments depicted in the drawings as appended.

BRIEF DESCRIPTION OF THE DRAWINGS

The accompanying drawings are included to provide a further understanding of embodiments of the present disclosure and are incorporated in and constitute a part of this specification. The drawings illustrate the embodiments of the present disclosure and together with the description serve to explain the principles of the present disclosure. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Figure 1:
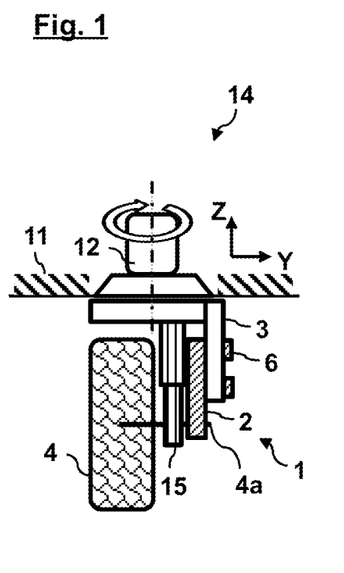
FIG. 1 schematically depicts a suspension system with a wheel carrier according to an exemplary embodiment of the present disclosure in a front view.
Figure 2:
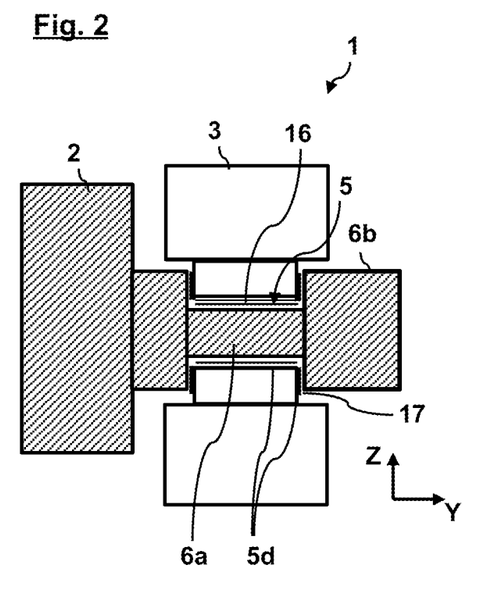
FIG. 2 is a detailed cross-sectional view of the wheel carrier of FIG. 1.
Figure 3:
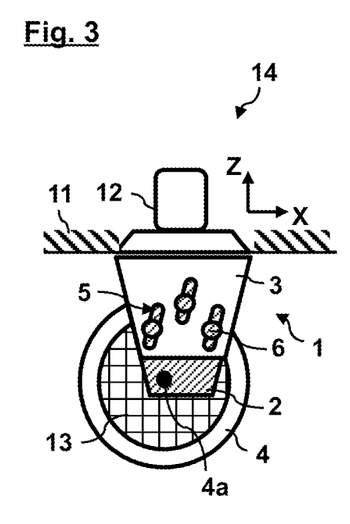
FIG. 3 is a side view of FIG. 1.
Figure 12:
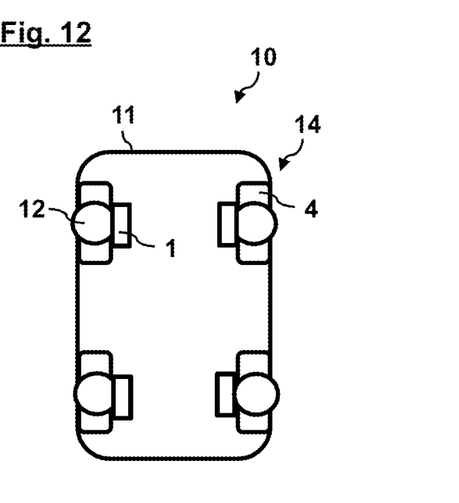
FIG. 12 shows a motor vehicle having a suspension system with four wheel carriers as they are shown in FIGS. 1 to 11.

FIG. 1 schematically depicts a suspension system 14 with a wheel carrier 1 according to an exemplary embodiment of the present disclosure in a front view. FIG. 2 is a detailed cross-sectional view of the wheel carrier of FIG. 1, while FIG. 3 shows a side view of FIG. 1. FIG. 12 depicts an exemplary vehicle 10 equipped with such a suspension system 14.

The vehicle 10 may be, for example, a purpose-built electric vehicle that is designed in a modular fashion based on two main parts, namely a vehicle platform or skateboard and an upper body structure or hat (not shown). The vehicle platform may represent the common substructure of the EV comprising chassis, powertrain, electric batteries and so on. The upper body structure on the other hand may come in different variants fulfilling various purposes according to the customer's needs (e.g., cargo transportation like last-mile delivery or similar, passenger transportation like autonomous shuttle services, buses, taxis and so on).

Small to medium sized PBVs require a new design approach to chassis hardware. In some applications, the PBV may be fully autonomous and not even carry passengers. Such circumstances reduce the ride and handling requirements of a PBV suspension system. The design proposed in the following presents an integrated bolt-on corner module that can be fitted to the corners of a PBV.

Figure 4:
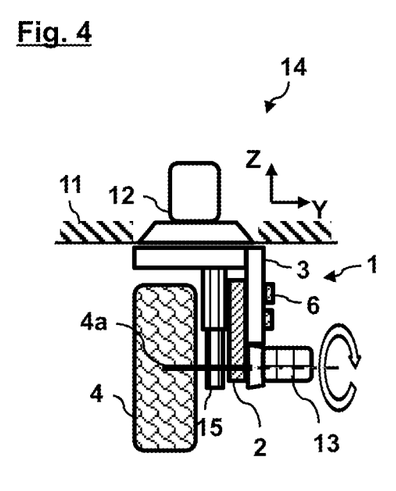
FIG. 4 schematically depicts a suspension system with a wheel carrier according to another embodiment of the present disclosure in a front view.

This is exemplified in FIG. 12, where each wheel 4 comprises its own steering motor 12 and wheel carrier 1, all of which may be fashioned together as a single integrated wheel module that is mounted to a vehicle body 11 of the motor vehicle 10 (that is, to the vehicle's skateboard). In addition to a steering motor 12, the modules may also comprise a driving motor 13 for providing torque to the wheels 4 (not shown here, see however FIGS. 3 and 4).

The underlying idea of the presently described approach is to enable a suspension (relative motion between a wheel center 4a and vehicle body 11) by splitting the wheel carrier 1 into two parts, namely a first carrier segment 2 or lower part that is coupled to the wheel center 4a and a second carrier segment 3 or upper part that is mounted to the vehicle body 11. A groove and sliding pin design concept regulates the relative motion between the two wheel carrier parts, thereby providing customizable wheel compliance and control in the different vehicle directions, as will be explained in the following.

Embodiments of the present disclosure provide the ability to tailor the vertical and horizontal displacements of the wheel center 4a independently of other suspension design parameters and thus offers significant improvements over conventional systems, which are normally restricted in their design and adjustability due to the intrinsic limitations of the other parameters.

Again, referring to FIGS. 1 to 3, the wheel carrier 1 may comprise a first carrier segment 2 configured to carry a wheel 4 of the motor vehicle 10 at a wheel center 4a and a second carrier segment 3 configured to couple the first carrier segment 2 with a vehicle body 11 of the motor vehicle 10. The second carrier segment 3 of this embodiment may comprise three elongated grooves 5 as an example, and the first carrier segment 2 may comprise for each groove 5 a corresponding (circular) sliding pin 6 configured to slidingly engage the respective groove 5 such that the pin 6 slides along the groove under vertical and/or horizontal displacements of the wheel center 4a with respect to the second carrier segment 3.

The second carrier segment 3 may be rotatably fixed to the vehicle body 11 to rotate around a vehicle vertical direction Z of the motor vehicle 10. The vehicle 10 comprises a steering motor 12 for each wheel 4 coupled to the respective wheel carrier 1 and configured to rotate the respective wheel 4 around a vehicle vertical direction Z of the motor vehicle 10 by rotating the wheel carrier 1 accordingly.

The steering motor 12 thus enables steering of the wheel 4. The steering motor 12 may be complemented by a drive motor 13 providing the torque to move the wheel 4 forwards and backwards. This driving motor 13 could be either fitted inside the wheel 4 (in-wheel), as shown in FIG. 3, or, alternatively, installed as a modular, e.g., bolt-on, unit as shown in the alternative embodiment of FIG. 4 (right-hand side of FIG. 4).

The suspension system 14 may further comprise an integrated spring and damper unit 15 providing wheel suspension and damping in the vehicle vertical direction Z of the vehicle 10. It should be noted in this respect that the pin and groove design of the present solution allows to vary the ratio between the vertical displacement and the horizontal displacement of the wheel center 4a, while this ratio is normally fixed by package and suspension travel in conventional systems. This opens up the possibility to increase the ride comfort, as this ratio may bet set to lower values than usual.

Coming back to FIG. 3, this embodiment may provide three grooves 5 in the second carrier segment 3 extending linearly along a straight line under a vertical inclination angle. The grooves 5 may be cut, for example, into the material of the carrier segment 3.

Figure 5:
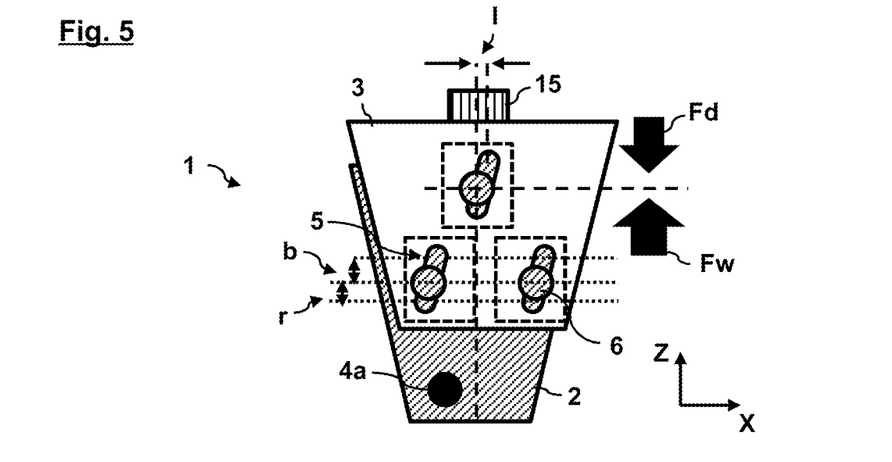
FIG. 5 is a detailed view of FIG. 3.

A more detailed view is shown in FIG. 5, which also depicts the forces from the spring Fd and due to the vehicle's weight Fw, which act on the sliding pin 6. In case of a bump, for example, the sliding pins 6 may be moved upwards with respect to the second carrier segment 3 (bump compliance b in FIG. 5). In case of a pothole, for example, the pins 6 may be moved downwards (rebound compliance r in FIG. 5).

As a result, the groove 5 and sliding pin 6 arrangement permits regulated motion between the two wheel carrier segments 2, 3, thereby providing wheel compliance and control in the vehicle X and Z directions.

FIG. 2 shows a detailed cross-sectional view of the wheel carrier of FIG. 1.

As can be seen here, each pin 6 may be formed with a stepped bearing profile along the vehicle lateral direction Y of the wheel 4, and each groove 5 is formed with a complementary stepped bearing profile along the vehicle lateral direction Y to lock each pin 6 within the respective groove 5 in the vehicle lateral direction Y. The respective mating surfaces 5d may be provided with a low friction coating and/or their surface is treated accordingly (e.g., by polishing). To compensate for potential tolerances in the components, a lubrication film 17 may be provided at the mating surfaces 5d.

Each pin 6 comprises a pin shaft 6a and a removable pin head 6b configured to be fixed on the respective pin shaft 6a to mount the first carrier segment 2 to the second carrier segment 3. To this end, each pin shaft 6a may first be plugged into the respective groove 5 from one lateral side.

Next, the respective pin head 6b may be attached to the respective pin shaft 6a from the respective other lateral side, e.g., by screwing. This then may lock the first carrier segment 2 to the second carrier segment 3 along the vehicle lateral direction Y of the wheel 4.

A sliding bearing 16 may be press-fitted on each pin shaft 6a of the first carrier segment 2 to receive the corresponding mating surfaces 5d of the respective grooves 5 of the second carrier segment 3.

Figure 6:
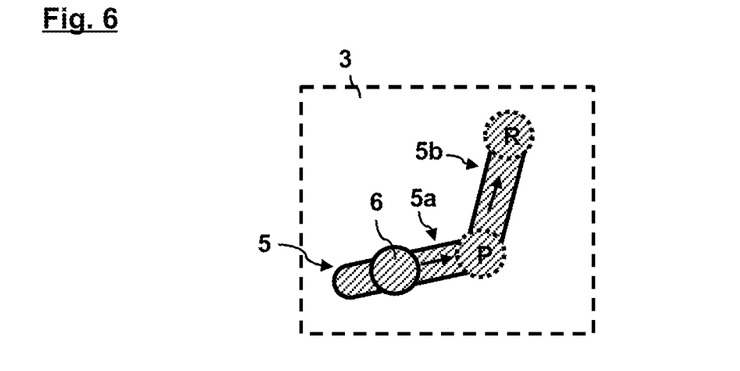
FIG. 6 depicts details of a wheel carrier according to another embodiment of the present disclosure.
Figure 7:
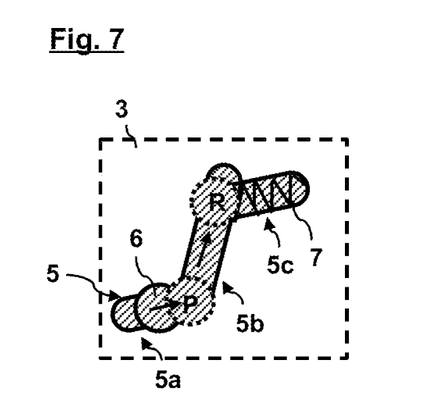
FIGS. 7 and 8 depict details of a wheel carrier according to yet another embodiment of the present disclosure in two different configurations.
Figure 8:
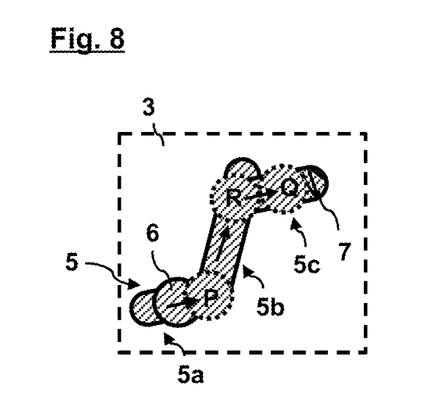

FIGS. 6 to 8 depict alternative and somewhat more sophisticated designs for the shape of the grooves 5 in the second carrier segment 3.

In the exemplary embodiment of FIG. 6, each groove 5 may extend linearly along a first straight line segment 5a with a first vertical inclination angle and from there along a second straight line segment 5b with a second vertical inclination angle. The first vertical inclination angle may be smaller than the second vertical inclination angle. For example, the first vertical inclination angle may be smaller than 45° or 30° and the second vertical inclination angle may be larger than 45° or 60°. The straight line segments 5a, 5b may be arranged such that the corresponding sliding pin 6 first moves along the first straight line segment 5a under vertical and/or horizontal displacements of the wheel 4 and then along the second straight line segment 5b.

This groove configuration may be more comfort oriented than the one in FIG. 5 as it allows a greater amount of longitudinal compliance (vehicle X) for a comparatively small amount of vertical travel (vehicle Z) until point P (cf. FIG. 6). Thereafter the ratio may be more balanced until point R, similarly to FIG. 5.

In the configuration of FIGS. 7 and 8, each groove 5 may further extend linearly along a third straight line segment 5c having a protection spring 7 arranged therein. The protection spring 7 may be configured to compress under contact with the corresponding sliding pin 6 entering the third straight line segment 5c.

This groove design may be optimized for rough road conditions and/or misuse conditions where the wheel center 4a may hit a large obstacle. In that case, the wheel 4 may initially move to point R. Thereafter, the impact energy may be consumed in compressing the protection spring until point Q, thereby limiting damage to the other parts of the suspension and vehicle body 11 further up the structure.

Figure 9:
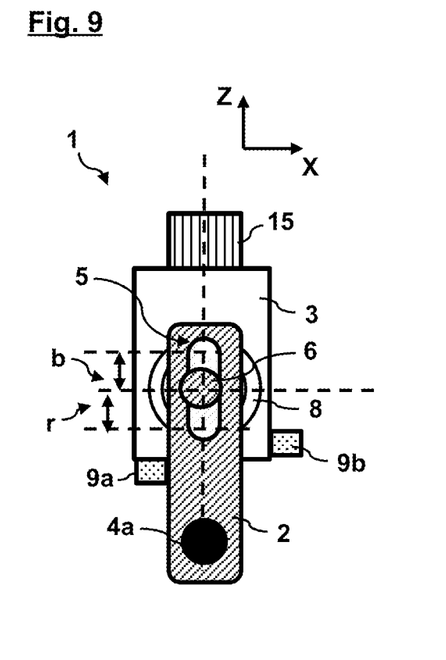
FIGS. 9 and 10 schematically depict a wheel carrier according to yet another embodiment of the present disclosure in a side view in two different configurations.
Figure 10:
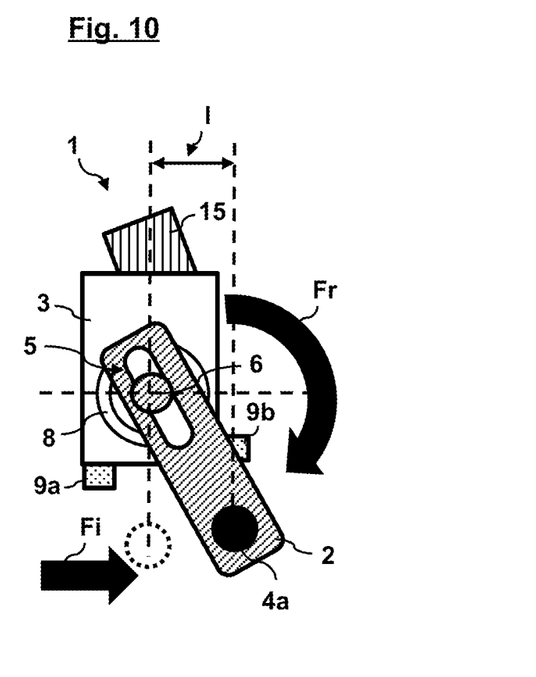
Figure 11:
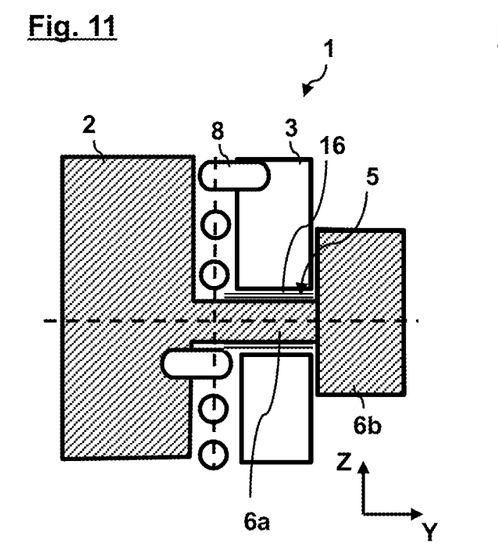
FIG. 11 is a detailed cross-sectional view of the wheel carrier of FIGS. 9 and 10.

FIGS. 9 to 11 schematically may depict a wheel carrier 1 according to yet another embodiment of the present disclosure.

In this case, one groove 5 may be provided that is aligned substantially vertical in a neutral configuration in order to provide vertical compliance. The first carrier segment 2 may be rotatably coupled to the second carrier segment 3 via a torsion spring 8 such that the first carrier segment 2 is rotated with respect to the second carrier segment 3 under horizontal displacement of the wheel 4 (cf. arrows in FIG. 10). The torsion spring 8 then may generate a restoring force Fr on the first carrier segment 2 to return to the neutral configuration.

The second carrier segment 3 may comprise two end stops 9a, 9b configured to block rotation of the first carrier segment 2 beyond a predefined angle. One end stop 9a may block any movement of the first carrier segment 2 in a forward (clockwise) direction of the wheel 4. The other end stop 9b may block movement of the first carrier segment 2 in a backward (counterclockwise) direction of the wheel 4 beyond a maximum rotation angle.

Hence, the vehicle compliance in X direction may be delivered via rotation of the first carrier segment 2 about the axis defined by the pin 6. Upon hitting an impact, the first carrier segment 2 may rotate to absorb the impact to a position as shown in FIG. 10 (the figure is exaggerated to show the rotation mechanism of the first carrier segment 2). This rotation may be resisted by the torsion spring 8. Eventually, the first carrier segment 2 may be returned to its original Position as shown in FIG. 9.

FIG. 11 shows that the torsion spring 8 may be mounted between the two carrier segments 2, 3 with each end of the spring 8 fixed to either part of the wheel carrier 1. Due to the circular shape of the sliding pin 6, existing commercially available sliding bearings 16 can be press-fitted onto a pin shaft 6a in a similar vein as in FIG. 2. The mating surfaces on the second carrier segment 3 may also in this case provided with a suitable surface finish or application of a low friction surface treatment/coating.

In the foregoing detailed description, various features are grouped together in one or more examples with the purpose of streamlining the present disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The embodiments were chosen and described in order to explain the principles of the present disclosure and its practical applications, to thereby enable others skilled in the art to utilize the present disclosure and various embodiments with various modifications as are suited to the particular use contemplated.

REFERENCE LIST 1 wheel carrier
2 first carrier segment
3 second carrier segment
4 wheel
4a wheel center
5 groove
5a first straight line segment
5b second straight line segment
5c third straight line segment
5d mating surface
6 sliding pin
6a pin shaft
6b pin head
7 protection spring
8 torsion spring
9a, 9b end stop
10 motor vehicle
11 vehicle body
12 steering motor
13 driving motor
14 suspension
15 spring and damper unit
16 sliding bearing
17 lubrication film
b bump compliance
r rebound compliance
l longitudinal compliance
P, R, Q points along groove
X vehicle longitudinal direction
Y vehicle lateral direction
Z vehicle vertical direction
Fd force from spring
Fw reaction force from vehicle weight
Fi horizontal impact force
Fr restoring force

What is claimed is:

1. A wheel carrier for a suspension of a motor vehicle, comprising:
   a first carrier segment configured to carry a wheel of the motor vehicle at a wheel center; and
   a second carrier segment configured to couple the first carrier segment with a vehicle body of the motor vehicle;
   wherein the second carrier segment comprises at least one groove, and the first carrier segment comprises for each groove a corresponding sliding pin configured to slidingly engage the respective groove such that the pin slides along the groove under vertical or horizontal displacements of the wheel center with respect to the second carrier segment;
   wherein the at least one groove extends linearly along a first straight line segment with a first vertical inclination angle and from there along a second straight line segment with a second vertical inclination angle, wherein the first vertical inclination angle is smaller than the second vertical inclination angle, and wherein the straight line segments are arranged such that the corresponding sliding pin first moves along the first straight line segment under vertical or horizontal displacements of the wheel and then along the second straight line segment.

2. The wheel carrier according to claim 1, wherein the first vertical inclination angle is smaller than 45 degrees, and the second vertical inclination angle is larger than degrees.

3. The wheel carrier according to claim 1, wherein the at least one groove further extends from the second straight line segment linearly along a third straight line segment having a protection spring arranged therein, the protection spring being configured to compress under contact with the corresponding sliding pin entering the third straight line segment.

4. The wheel carrier according to claim 1, wherein each pin is formed with a stepped bearing profile along a vehicle lateral direction of the wheel and each groove is formed with a complementary stepped bearing profile along the vehicle lateral direction to lock each pin within the respective groove in the vehicle lateral direction.

5. The wheel carrier according to claim 1, wherein each pin comprises a pin shaft and a removable pin head configured to be fixed on the respective pin shaft to mount the first carrier segment to the second carrier segment by first plugging in each pin shaft into the respective groove from one lateral side and then attaching the respective pin head to the respective pin shaft from the respective other lateral side, thereby locking the first carrier segment to the second carrier segment along the vehicle lateral direction of the wheel.

6. The wheel carrier according to claim 5, wherein a sliding bearing is press-fitted on each pin shaft of the first carrier segment to receive a corresponding mating surface of the respective grooves of the second carrier segment.

7. The wheel carrier according to claim 1, wherein the second carrier segment is configured to be rotatably fixed to the vehicle body to rotate around a vehicle vertical direction of the motor vehicle.

8. A motor vehicle comprising a suspension with at least one wheel carrier according to claim 1.

9. The motor vehicle according to claim 8, further comprising a steering motor for each wheel coupled to the respective wheel carrier and configured to rotate the respective wheel around a vehicle vertical direction of the motor vehicle by rotating the wheel carrier accordingly.

10. A wheel carrier for a suspension of a motor vehicle, comprising:
    a first carrier segment configured to carry a wheel of the motor vehicle at a wheel center; and
    a second carrier segment configured to couple the first carrier segment with a vehicle body of the motor vehicle;
    wherein the second carrier segment comprises at least one groove, and the first carrier segment comprises for each groove a corresponding sliding pin configured to slidingly engage the respective groove such that the pin slides along the groove under vertical or horizontal displacements of the wheel center with respect to the second carrier segment; and
    wherein the least one groove is aligned vertically in a neutral configuration in order to provide vertical compliance, and wherein the first carrier segment is rotatably coupled to the second carrier segment via a torsion spring such that the first carrier segment is rotated around the sliding pin with respect to the second carrier segment under horizontal displacement of the wheel and the torsion spring generates a restoring force on the first carrier segment to return to the neutral configuration.

11. The wheel carrier according to claim 10, wherein the second carrier segment comprises at least one end stop configured to block rotation of the first carrier segment beyond a predefined angle.

12. The wheel carrier according to claim 11, wherein one end stop blocks movement of the first carrier segment in a forward direction of the wheel.

13. The wheel carrier according to claim 11, wherein one end stop blocks movement of the first carrier segment in a backward direction of the wheel beyond a maximum rotation angle.

* * * * *